US010510057B2

(12) United States Patent
Priebatsch et al.

(10) Patent No.: US 10,510,057 B2
(45) Date of Patent: Dec. 17, 2019

(54) TOKEN-BASED GIFT CARDS

(71) Applicant: SCVNGR, Inc., Boston, MA (US)

(72) Inventors: Seth Priebatsch, Boston, MA (US);
Harald Prokop, Newton, MA (US);
Ari Pollak, Brookline, MA (US); Jason Urton, Boston, MA (US)

(73) Assignee: SCVNGR, INC., Boston, MA (US)

( * ) Notice: Subject to any disclaimer, the term of this patent is extended or adjusted under 35 U.S.C. 154(b) by 899 days.

(21) Appl. No.: 14/742,248

(22) Filed: Jun. 17, 2015

(65) Prior Publication Data

US 2016/0371668 A1    Dec. 22, 2016

(51) Int. Cl.
*G06Q 20/10*    (2012.01)
*G06Q 20/20*    (2012.01)
*G06Q 20/36*    (2012.01)
*G06Q 20/34*    (2012.01)

(52) U.S. Cl.
CPC .......... *G06Q 20/204* (2013.01); *G06Q 20/10* (2013.01); *G06Q 20/348* (2013.01); *G06Q 20/354* (2013.01); *G06Q 20/3672* (2013.01); *G06Q 20/3676* (2013.01); *G06Q 2220/00* (2013.01)

(58) Field of Classification Search
CPC ............................ G06Q 20/10; G06Q 20/204
USPC .......................................................... 705/66
See application file for complete search history.

(56) References Cited

U.S. PATENT DOCUMENTS

| 2004/0059672 | A1* | 3/2004 | Baig ...................... G06Q 20/02 705/40 |
| 2005/0086168 | A1* | 4/2005 | Alvarez ............... G06Q 20/027 705/41 |
| 2007/0168283 | A1* | 7/2007 | Alvarez ............. G06Q 20/1085 705/43 |
| 2012/0209749 | A1* | 8/2012 | Hammad ............... G06Q 30/06 705/27.1 |

* cited by examiner

*Primary Examiner* — Robert R Niquette
*Assistant Examiner* — Liz P Nguyen
(74) *Attorney, Agent, or Firm* — Hickman Palermo Becker Bingham LLP

(57) ABSTRACT

A method for transferring funds includes: 1) receiving, from a first user, a request to transfer a stored value to a second user; 2) identifying, based on a first user token and from a user database, a first entry containing information of a payment account of the first user; 3) causing a payment server to transfer funds corresponding to the stored value from the payment account of the first user to a stored-value account that is associated with a stored-value token; 4) associating the stored-value token with a second entry identifying a second user; 5) receiving a payment request initiated by the second user; 6) identifying the second entry based on a second user token included in the payment request; 7) updating funds in the stored-value account based on the payment request; and 8) transmitting at least a portion of the stored value to a merchant based on the update.

18 Claims, 5 Drawing Sheets

| User |
|---|
| able_to_refer *boolean* *
| admin *boolean* *
| born_at *datetime*
| braintree_customer_id *string*
| credit_amount *integer* *
| credit_cards_count *integer* *
| credit_currency_code *string* *
| day_after_first_order_reengaged_at *datetime*
| email *string (100)* *
| employee *boolean* *
| employer *string*
| encrypted_password *string (128)* *
| enrolled_in_employee_rewards_at *datetime*
| exploding_credit_added_at *datetime*
| exploding_credit_removed_at *datetime*
| facebook_access_token *string*
| facebook_user_id *string*
| failed_logins_count *integer* *
| first_name *string (50)* *
| gender *string*
| last_name *string (50)* *
| last_order_created_at *datetime*
| lat *decimal (15, 6)*
| lng *decimal (15, 6)*
| mooth_after_last_order_reengaged_at *datetime*
| orders_count *integer* *
| password_reset_at *datetime*
| paused *boolean* *
| percent_donation *decimal (6, 5)*
| phone *string* *
| referral_credit_added_at *datetime*
| regenerate_code *boolean* *
| salt *string (128)* *
| ssn *string* *
| subscriber *boolean* *
| subscription_token *string* *
| two_weeks_after_first_order_reengaged_at *datetime*
| week_after_registration_reengaged_at *datetime*

| UserAddress |
|---|
| address_type *string* *
| extended_address *string*
| locality *string* *
| postal_code *string* *
| region *string* *
| street_address *string* *

| UserEmailAudit |
|---|
| email_address *string* *

| Location |
|---|
| extended_address *string*
| lat *decimal (15, 6)* *
| lng *decimal (15, 6)* *
| locality *string* *
| payment_emails *text*
| payment_type *string*
| phone *string*
| postal_code *string* *
| region *string*
| street_address *string* *

FIG. 3B

TOKEN-BASED GIFT CARDS

PRIORITY CLAIM AND RELATED APPLICATION

This application claims priority to U.S. Provisional Application No. 62/013,307, entitled "Token-Based Gift Cards," filed Jun. 17, 2014.

FIELD OF THE APPLICATION

The present application generally relates to the field of payment systems, and more particularly to improved systems and methods for facilitating the purchase, delivery, redemption, transfer, and management of gift cards in physical and digital forms.

BACKGROUND

Some known systems and methods enable the purchase, delivery, and use of gift cards or other financial instruments or accounts that represent an amount of money to be exchanged for goods or services, or other forms of stored value and prepaid access. Such known systems and methods for gift cards, however, typically provide little or no opportunity for flexibility and creativity in the nature of the gift cards by placing limitations or conditions on the redemption of the gift cards; and provide limited or no opportunity for further interaction, information sharing, messaging, or marketing between and/or among associated parties related to the gift card system. Some known gift card systems also suffer easily-exploitable security flaws in that gift card information printed or encoded on a plastic card is subject to theft prior to the card's activation. Additionally, another disadvantage of existing gift card systems is the inability to provide gift card issuers (e.g., merchants) the flexibility to convert existing gift cards to a new gift card management platform or administration system without significant expense and burden.

Therefore, a need exists for a method and system that can provide a more interactive, customizable, flexible, and secure gift card experience for purchasers, recipients, suppliers, and merchants; can prevent or reduce theft and fraudulent activities; and can facilitate the conversion of a prior gift card scheme to the new system without creating an adverse user experience.

SUMMARY

In some embodiments, a method for transferring funds is disclosed. The method includes receiving, from a first user, a request to create a stored value and to transfer that stored value to a second user. In some instances, the stored value includes a gift card. In some instances, the request from the first user to transfer the stored value to the second user requests that the stored value be also redeemable by a third user. In some instances, the request from the first user includes information regarding an account of the second user on a social-media or dating website.

The method includes identifying, from a user database and using a first user token associated with the first user, a first entry associated with the first user. The first entry includes information related to a payment account of the first user. The method includes sending a request to a payment server to transfer an amount of funds from the payment account of the first user to a stored-value account, wherein the amount of the transferred funds corresponds to an amount of the stored value.

The method includes generating a unique stored-value token and a stored-value token record for the stored-value account, and then associating the stored-value token record and the stored-value token with the amount of the transferred funds. The method also includes associating the stored-value token with a second entry in the user database, wherein the second entry includes a second user token identifying the second user.

The method further includes receiving, from a merchant point-of-sale (POS) terminal, a request for payment initiated by the second user, wherein the request includes the second user token. The method includes identifying, from the user database and using the second user token, the second entry. The method includes updating the amount of funds associated with the stored-value token based on an amount of funds associated with the request for payment; and further transmitting, from the stored-value account and based on the update of the amount of funds associated with the stored-value token, at least a portion of the stored value to the merchant. In some instances, the method includes sending a notification of the transfer of stored value to the second user, wherein the notification is customized by the first user. In such instances, the notification can be delivered to the second user following the receipt of information communicated by a software application operated by the second user.

In some instances, the method includes receiving, from the first user, restrictions or limitations on the redemption of the funds. Such restrictions can include, for example, geographic limitations, temporal restrictions, item restrictions, merchant restrictions, or a specified order of merchants or items. In such instances, the method also includes associating such restrictions with the stored-value token record. Additionally, the method includes comparing information in the request for payment to restrictions associated with the stored-value token record and determining whether the request for payment satisfies those restrictions.

In some instances, the amount of funds associated with the request for payment is greater than the amount of the transferred funds associated with the stored-value token record. In such instances, the method further includes charging an excess payment amount to a payment account associated with the second user. In some instances, the generated stored-value token record includes an upper limit as a restriction on the redemption of the transferred funds such that the amount of stored value transmitted to the merchant cannot exceed the upper limit in a single transaction, in a specified number of transactions, or over a specified time period by the second user. In some instances, the method includes, after receiving the request for payment initiated by the second user, charging the amount of funds associated with the request for payment to the payment account associated with the first user. In some instances, the method includes (i) communicating to third parties information indicating that the second user has received the stored value; and (ii) communicating to the second user advertisements or incentives to redeem the stored value for products or services associated with said third parties.

Various advantages of the present application are apparent in light of the descriptions below.

BRIEF DESCRIPTION OF THE DRAWINGS

The aforementioned implementation of the present application as well as additional implementations will be more clearly understood as a result of the following detailed description of the various aspects of the application when taken in conjunction with the drawings.

FIG. 3B is a schematic illustration of a user record including various information that uniquely identifies a user in accordance with some embodiments.

DETAILED DESCRIPTION

Figure 1:
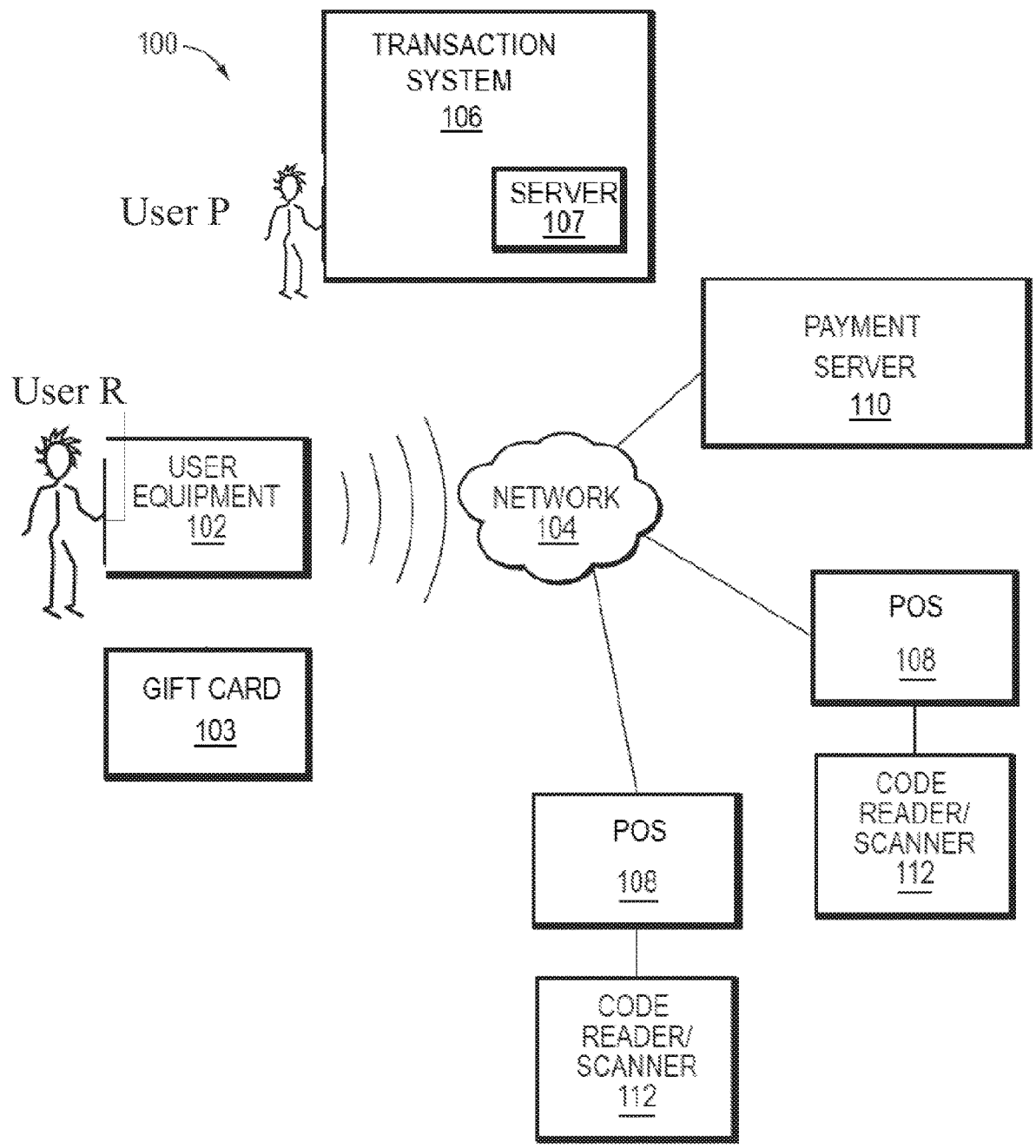
FIG. 1 is a schematic illustration of a gift-card system in accordance with some embodiments.

Embodiments of the present application include the creation of gift-card records as stand-alone records within a token-based transaction system, which may communicate directly or indirectly with (i) financial clearing networks, (ii) various merchant point-of-sale (POS) terminals (i.e., not just within one merchant), and/or (iii) consumer-facing mobile apps and websites. Other communication may take place with payment processing systems, online POSs, and various software applications, including web applications and mobile applications. The transaction system is capable of establishing accounts for system users by receiving identification and financial information from users and providing in return an identification code or token to users. The identification code can be communicated to merchant POS devices in communication with the transaction system to initiate payment for a transaction. Secure payment methods and systems are further discussed in U.S. Pat. No. 8,639,619, filed Dec. 18, 2012, the disclosure of which is hereby incorporated by reference in its entirety.

Gift cards records, such as digital representations of stored value, can be created in the transaction system and associated with a token or code. A digital representation of a gift card token can be sent to a recipient, and used via a mobile device such as a smart phone, tablet, or any other device capable of executing secure local applications ("apps") and communicating, typically via the Internet, with other devices. The transaction system disclosed herein enables consumer users of the transaction system to purchase and receive gift cards, including all forms of stored value, credit, and pre-paid access, in digital form by communication over the Internet to the transaction system, for example from an email application, web browser, or other application on a consumer computing device or a consumer mobile device, by creating codes or tokens associated with gift cards and with purchasing and receiving users. The system also facilitates the use of physical gift cards issued at POS locations that include an encoded representation of a gift card token corresponding to a record in the transaction system.

Gift card purchasers may dictate restrictions on the redemption or use of gift cards purchased via the transaction system (e.g., category or even item-level purchase restrictions) and select messaging and delivery mechanisms. In various embodiments, recipients of a gift card may communicate back with the gift-card purchaser after or even during the purchase transaction via the transaction system, for example within the app used to display the gift card token and redeem the gift card. Systems and methods in accordance herewith may further permit a recipient that has established a user account with the transaction system to apply gift-card credit toward a larger transaction amount and charge the balance to, for example, a debit card without the need for separate transactions or steps.

The transaction system also permits purchasers to purchase physical gift cards at merchant POS locations and use an identification code or gift card token encoded in or on physical cards to transact using the system. In certain embodiments, the transaction system permits the conversion of a physical gift card into a digital gift card using functionality within the applications of the transaction system, taking advantage, for example, of camera hardware standard on most mobile smart phone devices. Embodiments of the present application thus permit the creation of digitally based gift cards and their inter-conversion with traditional physical or electronic gift cards.

According to certain embodiments of the present application, the creation of code- and token-based gift card records typically occurs in a transaction system in communication with mobile or other computing devices, financial clearing networks, various merchant POS terminals and online POS portals of unaffiliated merchants, and with consumer-facing apps. The capabilities of various embodiments of the transaction system disclosed herein may include one or more of: (a) permitting users to convert a physical gift card to a mobile/digital gift card using standard mobile devices; (b) permitting users to convert existing magnetic stripe-based gift cards provided by a third-party to code or token-based cards administered by the disclosed transaction system at the merchant POS, or alternatively supporting existing magnetic stripe-based gift cards issued by a third party using a token-exchange method to the merchant POS device in a manner that is transparent to the user; (c) providing a purchasing user complete control over gift card restrictions, messaging, and delivery mechanisms, including based on integrations with other applications of the receiving user, and including SKU data level restrictions; (d) providing the receiving user the ability to communicate back to the purchasing user through the transaction system at various points in the gift card receipt and redemption process, through a mobile app; (e) providing SKU level data to the purchasing user and third parties concerning gift card redemption by the receiving user; (f) providing gift card purchase and receipt data to third parties for the purpose of targeting marketing and advertising to gift card recipients; and (g) applying gift-card credit at the time of a purchase transaction that is less than the transaction amount, while charging the balance of the transaction amount to a user's credit or debit card, without an additional transaction step by the user at the merchant POS (among other advantages disclosed herein).

In other embodiments of physical gift cards administered using the disclosed transaction system, a second "activation" token (e.g., a QR or bar code) is associated with a gift card (in addition to the standard gift-card token printed on the card) to secure the gift card from pre-activation theft. The second code or token (such as a QR code encoding a token) is used for activation of the gift card token only, such that the activation code or token can be printed in the form of a code on the outside of the sealed packaging for a physical gift card, while the gift card code or token encoded on the physical card remains secure from pre-activation theft.

Certain of the embodiments of the present application described herein provide a transaction platform or transaction system, including or comprising transaction servers and web servers and related components, and in communication with POS terminal devices and related components, and consumer computing and mobile devices and related components and necessary software and/or web applications, via existing communications networks, arranged to facilitate a fully customizable and interactive gift card experience among users, purchasers, recipients, suppliers, and retail merchants. In addition, certain of the embodiments of the present application described herein provide a transaction platform that enables the production, printing, and packaging of plastic gift cards usable in connection with the platform that ensures the security of the printed cards against theft or fraud.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To promote an understanding of the objectives, technical solutions, and advantages of the present application, embodiments of the present application are further described in detail below with reference to the accompanying drawings.

FIG. 1 is a schematic illustration of a gift-card system 100 in accordance with some embodiments. In some embodiments, the gift-card system 100 can also be referred to as, for example, a mobile-payment transaction network 100. As shown in FIG. 1, the gift-card system 100 includes a user equipment 102 (e.g., a computing device or mobile device) that is connected to a network 104. The network 104 can include various interconnected devices to support wired, wireless, or any other type of two-way communications. In some embodiments, the network 104 can be any type of network configured to operatively couple one or more server devices (e.g., the transaction system 106, the payment server 110, etc.) to one or more user devices (e.g., the user equipment 102, the merchant system 108, etc.), and enable communications between the server device(s) and the user device(s). In some embodiments, the network 104 can include one or more networks such as, for example, a cellular network, a satellite network, a local area network (LAN), a wide area network (WAN), a wireless local area network (WLAN), or any wide-area network or combination of networks capable of supporting point-to-point data transfer and communication. In some embodiments, the network 104 can include the Internet.

Furthermore, the network 104 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), bluetooth, Wi-Fi, voice over internet protocol (VoIP), Wi-MAX, etc.

The network 104 connects various devices including a transaction system 106, which includes a transaction system server 107, and one or more merchant systems 108, and a payment server 110. In some embodiments, the transaction system 106 can be a management server (as shown in FIG. 2B). The network 104 can utilize wired, wireless, or any other types of two-way communications to connect the associated devices. The transaction system 106 can also be connected via the network 104 to other computing devices and software or web-based applications (shown or not shown in FIG. 1).

In some embodiments, a server device (e.g., the transaction system server 107, the payment server 110, etc.) included in the gift-card system 100 can be, for example, a background server, a back end server, a database server, a workstation, a desktop computer, a cloud computing server, a data processing server, and/or the like. In some embodiments, such a server device (e.g., the transaction system server 107, the payment server 110, etc.) can be a server cluster or server center consisting of two or more servers (e.g., a data processing server and a database server).

Each merchant system 108 can be associated with a merchant who offers goods or services for sale to a user possessing the user equipment 102. The user can be involved in a transaction (e.g., purchase, receive, sell, give away, etc.) of a gift card 103. In some embodiments, the merchant system 108 can be, for example, a point-of-sale (POS) system such as a POS terminal (e.g., an electronic cash register) or an online POS portal.

In some embodiments, as shown in FIG. 1, a merchant system 108 can include or connect to a code reader or scanner (hereafter "reader") 112. The reader 112 can be capable of reading, optically scanning, receiving, decoding a token such as, for example, a barcode, a radio-frequency identification (RFID) code, or a "Quick Response" (QR) code, and/or receiving signals such as, for example, near field communication (NFC) signals, Bluetooth signals, iBeacon signals, audio signals, infrared signals, and/or the like. Additionally, in some embodiments, the reader 112 can be mobile or physically associated with the merchant system 108, and in communication with the merchant system 108 via wired or wireless communication methods.

The payment server 110 can be operated by a payment-processing entity responsible for authenticating, processing, and/or actually performing the payment transaction. Such a payment-processing entity can be, for example, a "direct" payment processor or an "indirect" payment processor. A so-called "direct" payment processor represents a financial-processing backend provider to credit-card issuers and payment services such as PAYPAL. A so-called "indirect" payment processor is an independent entity processing transactions for multiple payment services and maintains its own records and data.

The mobile device 102 acts as a gateway for transmitting a user's data to the network 104. The mobile device 102 can support multiple communication channels for exchanging multimedia and other data with the servers 106, 110 and other devices using, for example, a Wi-Fi LAN (e.g., IEEE 802.11 standard) for Internet access, a short-range Bluetooth wireless connection for point-to-point access, and/or an NFC channel for close-proximity access.

Figure 2A:
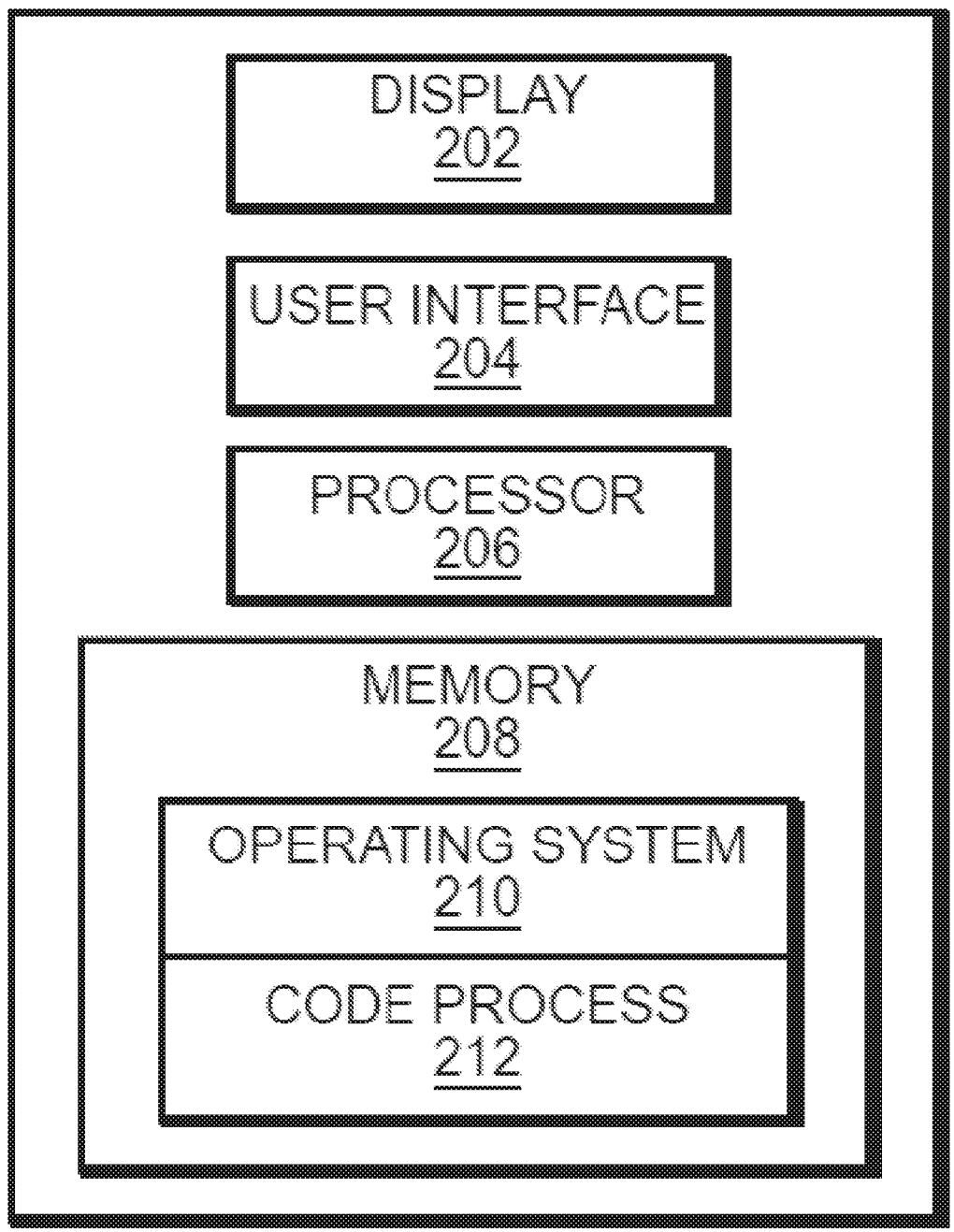
FIG. 2A is a block diagram illustrating components and/or modules of a user equipment in the gift-card system of FIG. 1.
Figure 2B:
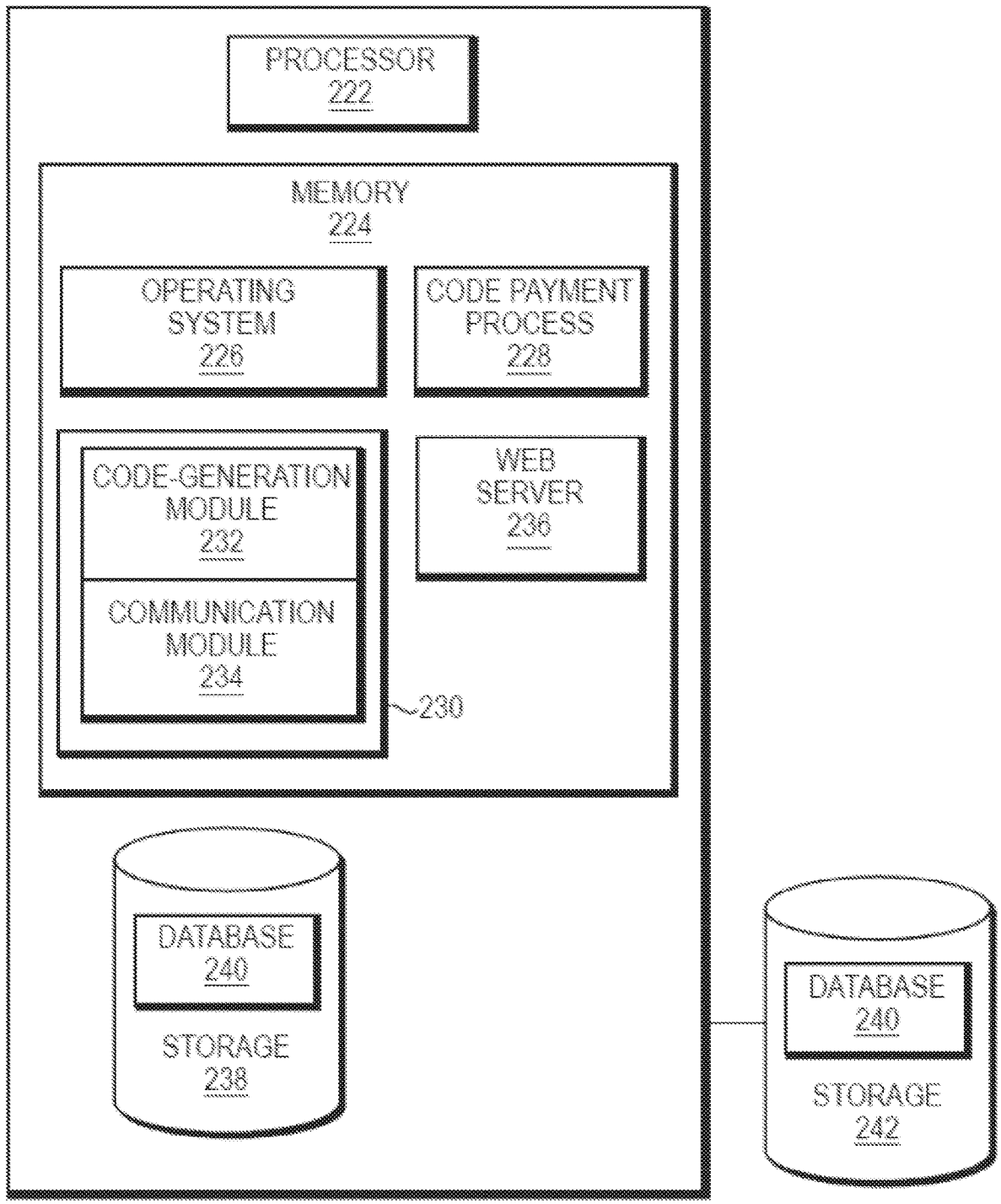
FIG. 2B is a block diagram illustrating components and/or modules of a management server in the gift-card system of FIG. 1.

FIG. 2A is a block diagram illustrating components and/or modules of the user equipment 102 in the gift-card system 100 of FIG. 1. In some embodiments, a user equipment (e.g., the user equipment 102) can be, for example, a mobile device. As used herein, the term "mobile device" used for transacting a mobile payment refers to a smart phone or tablet or any other type of portable device with advanced computing ability that, generally, facilitates bi-directional communication and data transfer using a mobile telecommunication network, and is capable of executing locally stored applications and/or payment transactions. In some embodiments, such a user equipment or mobile device can be, for example, a cellular phone, a smart phone, a mobile Internet device (MID), a personal digital assistant (PDA), a tablet computer, an e-book reader, a laptop computer, a handheld computer, a desktop computer, a wearable device, and/or any other personal, portable electronic device. In some embodiments, a user equipment or mobile device can be referred to as, for example, a user device, a client device, a terminal, a portable device, and/or the like.

As shown in FIG. 2A, the user equipment 102 includes a conventional display 202, a user interface 204, a processor 206, and a memory 208. In some embodiments, although not shown in FIG. 2A, a user equipment (e.g., the user equipment 202) can also include one or more transmitters and/or receivers that are capable of transmitting and/or receiving signals such as, for example, cellular signals, wireless signals, radio-frequency signals, NFC signals, Bluetooth signals, iBeacon signals, audio signals, infrared signals, and/or the like.

The memory 208 is configured to store software programs and/or modules. The processor 206 can execute various applications, programs and/or functions included in the software programs and/or modules stored in the memory 208. In some embodiments, the memory 208 can include, for example, one or more high-speed random-access memory (RAM), non-volatile memory such as a disk storage device and a flash memory device, and/or other volatile solid state memory devices.

As shown in FIG. 2A, the memory 208 includes an operating system (OS) 210 such as, for example, GOOGLE ANDROID, NOKIA SYMBIAN, BLACKBERRY RIM or MICROSOFT WINDOWS MOBILE, and a code process 212 that implements the device-side functions as further described below. In some embodiments, the user equipment 102 alone may not require a network to be used in the context of the present application. In addition, additional transactional information may be embedded in the code process 212 for transmission through the network 104 for later processing on a back-end server (e.g., the payment server 110 in FIG. 1).

FIG. 2B is a block diagram illustrating components and/or modules of the management server (i.e., the transaction system 106) in the gift-card system 100 of FIG. 1. As shown in FIG. 2B, the transaction system 106 (functioning as a payment and identity management server) includes a processor 222; a memory 224 having an operating system 226, a code payment process 228, a service application 230 and a web-server block 236; and a storage device 238. Furthermore, the server application 230 includes a code-generation module 232 and a communication module 234; and the storage 238 includes a database 240.

In some embodiments, the code payment process 228 implements the server-side functions of facilitating secure mobile payments as further described below. The service application 230, by integrating the code-generation module 232 with the communication module 234, generates a unique user identifier and/or gift card token identifier and communicates that with the mobile device 102. More specifically, the code-generation module 232 can generate a unique code tied to the information received from the user via the communication module 234, or tied to a gift card record in the transaction system 106. A generated user identification code can then be transmitted back to the mobile device 102 via the communication module 234.

In such embodiments, the code-generation module 232 functions similarly to a conventional code-generator that converts the input information into a form that can be readily read or executed by a machine. The communication module 234 can be a conventional component (e.g., a network interface or transceiver) designed to provide communications with a network such as the Internet and/or any other land-based or wireless telecommunications network or system, and, through the network, with the mobile device 102.

To enable the handling of requests from the mobile device 102, the memory 224 contains the web-server block 236, which can be a conventional web server application executed by the processor 222. The transaction system 106 can include the user database 240 that resides in the storage device 238 and/or an external mass-storage device 242 (as shown in FIG. 2B) accessible to the transaction system 106. The user database 240 stores, for example, a record of each registered user and a readable code or signal associated with each user record. The readable code may be a mature code (e.g., a QR code or a bar code), a seed code that can generate a mature code later, or an authentication token. In some embodiments, the readable code is unchangeable. In some other embodiments, the readable code can be changed such as reset periodically (e.g., in a predetermined period of time) for security purposes and/or upon receiving a request from the user. The user database 240 (or another similar database) also stores a record for each gift card created in the transaction system 106 along with a readable code or signal associated with each gift card record. As an example, FIG. 3B is a schematic illustration of a user record including various information that uniquely identifies a user in accordance with some embodiments.

In some embodiments, the storage devices 238, 242 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The storage devices 238, 242 may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Functions that can be performed by the gift-card system 100 shown and described with respect to FIGS. 1, 2A and 2B are described below.

User Accounts.

In some embodiments, the transaction system 106 can permit users to establish accounts with the transaction system 106 by providing information including at least: (i) some addressable information of the user, such as an email address, IP address, device identifier, phone number, and/or the like; and (ii) some financial account information, such as a debit or credit card account number, a prepaid credit card account number, a bank account number, and/or the like. Upon establishing an account, the transaction system 106, via the code generation module 232, can create and/or assign, to a user, an identification token.

In some embodiments, an identification token for a user can be encoded or represented in the form of, for example, a bar code, QR code or other pattern that can be read or scanned by an optical scanner, either from the display of a computing or mobile device or a printed paper or card. The identification token can also be, for example, an alphanumeric code, or which may be encoded or represented as data that can be communicated to a POS terminal system by a computing or mobile device using a proximity wireless communication technology such as NFC, Bluetooth, or iBeacon technology. The identification token can also be an alphanumeric that may be communicated to a POS terminal or entered into an online POS, or a combination of the above methods. The identification token is associated in the transaction system 106 with the user's information including the addressable identification information and financial account information, and is stored in the user database 240.

Thus, a user may initiate a purchase transaction at a merchant system 108 (e.g., a POS terminal or online POS) by presenting, displaying, or communicating her user identification token to the merchant, for example, via a reader or scanner 112 in connection with a merchant POS terminal 108. The merchant then seeks authorization of the purchase transaction by communicating (e.g., over established, existing networks 104) the received information (including the user identification token) to the transaction system 106. The communicated information includes, for example, at least the transaction amount and the user identification token. In some embodiments, the merchant can also submit information including a merchant identification token assigned to that merchant by the transaction system 106. The transaction system 106 then can approve (or disapprove) the transaction by communicating in response to the merchant system 108 (e.g., via the network 104). The transaction system 106 can also communicate a response to the user device 102. In some embodiments, the transaction system 106 can in turn submit a charge to a financial account associated with the user identification token using any known method for processing electronic transactions (e.g., through the payment server 110). In such a way, the transaction system 106 makes or facilitates a payment to the merchant.

User Payment Transactions.

Figure 3A:
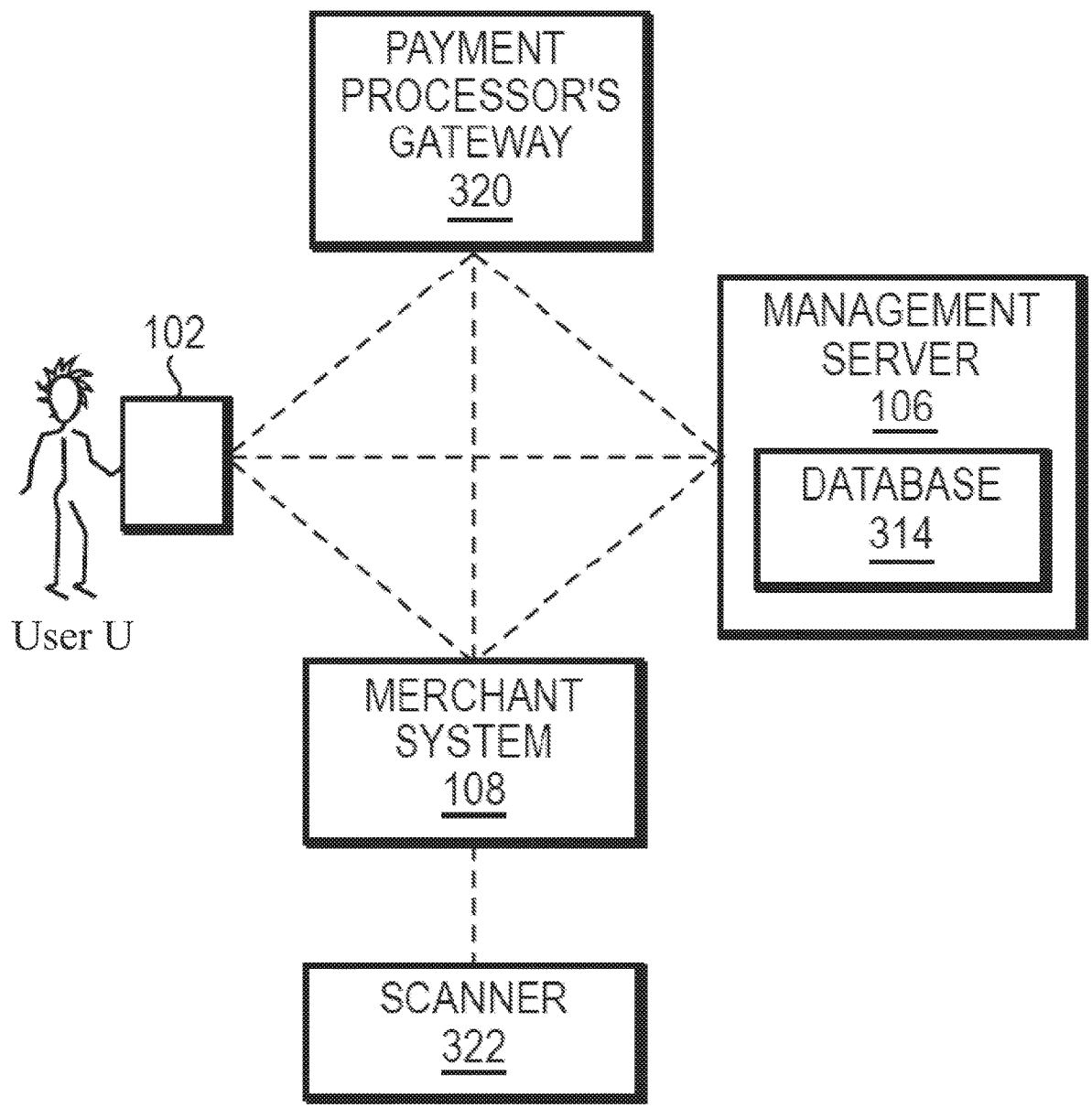
FIG. 3A is a schematic illustration of a system for performing secure payment transactions in accordance with some embodiments.

FIG. 3A is a schematic illustration of a system for performing secure payment transactions in accordance with some embodiments. In some embodiments, payment transactions in accordance herewith include or consist of three phases: an activation phase, a registration phase, and a use phase. First, in the activation phase, a user U (e.g., the user U shown in FIG. 3A that operates the user equipment/mobile device 102) provides identifying information to the transaction system/management server 106 using, for example, a mobile device 102 or web application and via a network (e.g., the network 104 in FIG. 1, not shown in FIG. 3A).

The code-generation module 232 (shown and described with respect to FIG. 2B) of the transaction system 106 then generates a unique user identifier tied to an account associated with the user U. The user's account, in turn, may be represented by a record in a user database 314 maintained by the transaction system/management server 106. Such a user record can include, for example, the transmitted user information and/or generated user identifier, as well as other information (name, address, wireless phone number, or any information listed in FIG. 3B) uniquely identifying the user. In some embodiments, a user record may be part of, or include a pointer to, that user's financial account information. In some embodiments, a unique user identifier can be, for example, a seed code utilized to generate a unique mature code (e.g., a QR code or other types of code) that can be captured by, for example, a merchant system 108 (e.g., a POS terminal).

In some embodiments, the generated unique mature code can be stored in the database 314 and successively transmitted to the user's mobile device 102 via, for example, wireless cell phone communication, ultrasound, Bluetooth. NFC, Internet, or a mobile application. In some other embodiments, the unique mature code can be directly sent to the mobile device 102 without being stored in the database 314. In such embodiments, the unique mature code can be later presented to the merchant system 108 when the user U purchases goods or services, as further described below.

In some embodiments, the mature QR code is associated with the user's identity information stored in the database 314 only and contains no information about any user's payment tokens (e.g., credit or debit card information) or payment instrument data. In such embodiments, as a result, hacking the management server 106 alone cannot provide sufficient information to conduct a fraudulent payment. Additionally, the unique identifier may be used as a seed to generate a multitude of QR codes, all of which can be decoded back to a single unique QR code, thus allowing for new QR codes to be generated and pushed to the mobile device 102, for example, on a periodic, per-transaction or time-out basis. Meanwhile, the same key, which is generated with respect to the unique QR code, can be used to validate any of these additional QR codes. In addition, the QR code may be reset upon receiving a request from the user, for example, at the beginning of each transaction. All the features discussed above further prevent a fraudulent use of the QR code.

Although the discussion herein focuses on QR codes for purposes of illustration, in other embodiments, the present application is not limited to any particular form of code. In some embodiments, any suitable mechanism for representing and transferring a code derived from a seed code may be used. For example, ultrasound, Bluetooth, NFC or other communication media besides visual representation and automated recognition may be used and are within the scope of the present application.

Next, in the registration phase, the user U registers a payment instrument (e.g., a credit card, debit card, a bank account, or a pre-loaded payment card) to her user account. In a representative transaction flow, the user U first issues a registration request to the transaction system/management server 106 using the mobile device 102 or a web application. The transaction system 106 responds to the request with a registration form (e.g., in the form of a web page), which is displayed on the mobile device 102 in a manner that permits the user U to enter information identifying the payment instrument to be registered.

In some embodiments, the registration form includes a client-side script that directly submits the data entered by the user U to a third-party payment processor's gateway 320 over, for example, a secure sockets layer (SSL) connection or any other suitable connection. The user-entered data is then stored in or by the third-party payment gateway 320, which also generates a "redirect" uniform resource locator (URL) that includes the Internet address of the transaction system 106 and a token that identifies the payment instrument, but does not identify the user U.

When the user submits the entered registration data, the client-side script causes a request for the redirect URL also to be transmitted to the gateway 320. When the redirect URL arrives at the mobile device 102 and is processed by the browser of the mobile device 102, it redirects the browser back to the transaction system 106 without displaying any content, thus creating the impression that the user U has never left the transaction server site.

In another representative transaction flow, the user U transmits information about the payment instrument to the transaction system 106 using the mobile device 102. The transaction system 106 encrypts the received information with a one-way key and passes the encrypted data to the third-party payment gateway 320. The third-party payment gateway 320, which is the only entity having the key to decrypt the data in the transaction, generates a token that identifies the registered payment instrument. The generated token is then transmitted back to the transaction system 106 and stored therein for transacting future payments. Thus, the data including a user's identity and payment instrument is separately stored in the transaction system 106 and the third-party payment gateway 320, respectively. As a result, unauthorized access to the records stored at any one of these two locations (i.e., the transaction system 106 and the third-party payment gateway 320) is insufficient to initiate a payment transaction under the user's name. Such a mechanism, therefore, again ensures the security of the mobile payment.

In some embodiments, the token generated by the third-party payment gateway 320 is transmitted to the transaction system 106. In such embodiments, the transaction system 106 associates the token with the user's account record and stores the token in the database 314 as a payment identifier. Upon receiving a payment request from the user U (e.g., a transaction initiated by the user U at the merchant system 108 and communicated to the transaction system 106), the transaction system 106 uses the stored token to initiate the payment transaction through the third-party payment gateway 320. Such a payment transaction is processed in association with the payment instrument previously submitted, without ever having knowledge or possession of the payment-instrument data itself. In such a method, since the payment-instrument data is not stored and cannot be obtained by the transaction system/management server 106, fraudulent payments can be prevented.

Last, in the use phase, the transaction system/management server 106 executes the instructions of the code payment process 228 (shown and described with respect to FIG. 2B) and transmits a QR code to the user's mobile device 102 for presentation to a merchant system 108. As noted above, the QR code may be revised (e.g., periodically or irregularly) for security purposes, and is typically generated using encryption based on user-specific information in the database 314. A payment transaction is initiated when the user presents the QR code stored in the mobile device 102 to the merchant system 108. The merchant system 108 may scan the code using a scanner 322 (e.g., a POS integrated scanner). The merchant system 108 can then transmit the scanned data along with the payment amount to the transaction system 106. Thus, at the time of the payment transaction, neither the merchant system 108 nor the user U has access to the underlying payment instrument, and the QR code merely identifies the user U. Furthermore, in the case of a QR code being reset (e.g., periodically or irregularly), even an image of the presented QR code may not be used again for future payments (as the user would by then have a new QR code).

In some embodiments, upon receiving the QR code and payment amount from the merchant system 108, the transaction system 106 decodes the QR code and matches the information therein to the user's record stored in the database 314. The transaction system 106 then retrieves the stored payment token associated with the user's account and passes the token and the amount to be charged to the third-party payment gateway 320 for authorizing a payment. The third-party payment gateway 320 authorizes and processes (approves or rejects) the payment request against the payment instrument associated with the token, and creates an associated transaction identifier or rejection code. The created identifier or code may be sent to the transaction system 106 for re-transmission to the merchant system 108, or may instead be sent directly to the merchant system 108 to complete the transaction.

In some embodiments, if the created identifier is first handled by the transaction system 106 before it is transmitted to the merchant system 108, the transaction system/management server 106 may generate and provide additional information (e.g., tracking information) to the merchant system 108 to enable a closed-loop environment of consumer information (e.g., effectiveness of advertisement, consumer demographics, and referral information). Again, because none of the user's mobile device 102, the merchant system 108, the transaction system 106, or the third-party payment gateway 320 possesses both user identity information and the underlying payment instrument, this triple-blind payment system provides high security for the user's identity and privacy. Accordingly, the possibility of financial losses for the customer is reduced during a payment transaction in accordance herewith.

Digital Gift Card Purchases; Creation of Gift Card Records.

In some embodiments, with reference to FIG. 1, a purchasing user P (shown as user P in FIG. 1) of the transaction system 106 may purchase a digital gift card for a recipient R (shown as user R in FIG. 1) by first establishing an account with the transaction system 106 as discussed above. The purchasing user P conducting the purchase of a digital gift card (in communication with the transaction system 106 over the network 104 using an interface to an application on the computing or mobile computing device 102) may identify the recipient R of the digital gift card by at least some addressable information or, if the recipient R has previously established an account with the transaction system 106, by identification of an alias, token, or identifier assigned by the transaction system 106 to the receiving user R. In some embodiments, to the extent the purchasing user P and receiving user R of the transaction system 106 have granted the system permissions to access personal information on third party web servers (e.g., social media servers, dating website servers, etc.) via the network 104, the receiving user R may also be identified based on information from such third party servers.

Upon the purchase of the digital gift card by the purchasing user P, according to the transaction flow described above, the transaction system 106 creates a record, account, or other data structure for the purchased gift card within a storage device such as the database 240 (shown and described with respect to FIG. 2B) and/or the database 314 (shown and described with respect to FIG. 3A). As a result, such a storage device includes an identification code or token for the gift card ("gift card token"). The associated data entry in the storage device may further include or be associated with information identifying the purchasing user P's account or record in the transaction system 106; information identifying the recipient R's address, account or record in the transaction system 106; the gift card amount; the gift card characteristics and/or limitations.

In some embodiments, as explained further below, limitations (or restrictions, conditions) of a gift card can include, for example, merchants or locations, categories of merchants and locations, where the gift card may be used, items or categories of items that may be purchased using the gift card, any temporal, geographic, or other limitations, and/or any other conditions precedent to the use or redemption or use of the gift card. In some embodiments, limitations of a gift card can also include, for example, details of any customized message to be conveyed to the gift card recipient and the nature of the delivery (e.g., the medium and timing for delivery).

In some embodiments, the gift card token is unique and different from the identification code or token assigned to the purchasing user P and the receiving user R. The transaction system 106 may charge the purchasing user P for the gift card amount purchased immediately, upon delivery, at a future specified time, upon the redemption of the gift card, or at any suitable time as the issuer and/or transaction system 106 specify. To charge the gift card amount, the transaction system 106 can use the financial account information associated with the purchasing user's identification code or token within the transaction system 106, in the manner discussed herein. The purchasing user P's account or record in the transaction system 106 may also be updated to include information concerning the purchased gift card token.

Delivery of Digital Gift Cards to Transaction System Users.

The transaction system 106 next delivers a notification to the recipient of the gift card in accordance with the purchasing user P's instructions. In some embodiments, if the recipient R has previously established an account with the transaction system 106 and is using a computing or mobile device 102 with an application capable of interaction with the transaction system 106 (e.g., via the network 104), the notification may be delivered directly to such an application on the mobile device 102. In some other embodiments, the notification may additionally or alternatively be delivered by any addressable means provided by the gift card purchaser P and/or associated with the recipient user R's identification code or token in the transaction system 106, such as by email or short message service (SMS).

In some embodiments, a gift card recipient R can establish an account with the transaction system 106. In such embodiments, the receiving user R can acknowledge the gift card notification from the transaction system 106 by, for example, clicking a button or a web link in an application or email to communicate to the transaction system 106. Upon receiving such an acknowledgment, the transaction system 106 can associate the gift card record (e.g., identified by the gift card token), including the corresponding gift card credit amount, with the receiving user R's account or record in the transaction system 106. Accordingly, the transaction system 106 can associate the gift card record with the receiving user's identification token. In some embodiments, such associations can be performed in a manner similar to the way that payment tokens received from a payment server 110 are associated with a user account as described above. In such embodiments, association of the gift card identification token to the receiving user R's account can alternatively occur independent of the delivery notification, immediately upon purchase of the gift card by the purchasing user P, at a time specified by the purchasing user P, or upon completion of some other event. The notification to the receiving user R may also take the form of a notification to a non-user of the transaction system, as explained below.

Delivery of Digital Gift Cards to Non-User Recipients.

In some embodiments, if a designated recipient RR of the purchased gift card does not have an account established with the transaction system 106, the recipient RR can be notified of the gift card in a communication to the address provided by the purchaser P, for example by email, SMS, or other means. The notification may include, directly or indirectly, a gift card identification token associated with the purchased gift card record in the transaction system 106, which may be encoded or represented in the form of a bar code, QR code, or other pattern that can be scanned by an optical scanner 112 at a merchant POS terminal 108, either from the display of a computing device 102 or a printed paper or card. The gift card identification token can also be, for example, an alphanumeric code that can be encoded or represented as data that can be communicated to a merchant system 108 by a computing device 102 using a proximity wireless communication technology (e.g., NFC, Bluetooth, iBeacon technology, or a combination of these methods).

Next, the recipient RR can download, store, and/or print such gift card token information and/or representation. In some embodiments, optionally, the recipient RR can be prompted, in a communication to the address provided (either in the notification communication or in another communication), to create an account with the transaction system 106 and associate the received gift card to the newly created user account or record. The notification communication to a non-user of the transaction system 106 may require the recipient RR to communicate to the transaction system 106 (e.g., via the network 104) in order to activate the received gift card. Alternatively, the gift card may be usable immediately without further communication to the transaction system 106.

Physical Gift Cards; Conversion of Physical Cards to Digital Cards.

In some embodiments, persons may purchase physical gift cards 103 (as shown and described with respect to FIG. 1) for recipients. Such a physical gift card can be, for example, a plastic card purchased at a merchant's POS or purchased at an online POS 108 and delivered by mail, or a paper printout of a representation of a digital gift card identification token purchased as explained above. The physical gift card can include a representation of a gift card token assigned by the transaction system 106, and can be used to communicate that token to a merchant system 108, such as via a scanner 112 (as shown and described with respect to FIG. 1).

In some embodiments, a physical gift card 103 may be presented to a recipient R who has established an account, or who later establishes an account, with the transaction system 106. Such a recipient R receives a user identification token identifying the user R within the transaction system 106. An application that integrates, interfaces, and/or communicates with the transaction system 106 may be operated on a computing or mobile device 102 operated by the recipient R, wherein the mobile device 102 can include a standard scanner or camera operational to capture images. Such a scanner or camera can be used by the application to capture an image of the physical gift card token of the physical gift card 103 (e.g., encoded in a bar code, QR code or other visual representation printed on the physical gift card 103).

The mobile device 102 can then communicate the scanned gift card token and the user R's identification token to the transaction system 106 (e.g., via the network 104). The transaction system 106 can then associate the gift card record in the transaction system 106 by, for example, associating the scanned gift card token (e.g., including any remaining value amount associated with that gift card record) with the recipient user R's account identified by the transmitted user identification token. The transaction system 106 can then cancel the validity of the gift card token printed on the physical gift card 103, thus rendering the physical gift card 103 unusable. The recipient user R can then redeem the remaining gift card value associated with the gift card record, which is now associated with the recipient user R's account in the transaction system 106, as a digital gift card, in the manner explained below. In this way, the transaction system 106 provides an efficient and user-friendly method to convert the physical gift card 103 to a digital gift card using commonly available mobile devices, without any additional hardware.

Redemption of Gift Cards by Transaction System Users.

Following the association by the transaction system 106 of a gift card token to the recipient user R's transaction system account (i.e., a user identification token), the recipient user R can present her identification token, rather than the gift card token, at a merchant's POS terminal or online POS 108 to initiate payment for a purchase transaction. Upon presentation of the user identification token of the recipient user R (e.g., by scanning a QR code on the display of a mobile device 102 at an optical scanner 112 in connection with the merchant system 108), the merchant communicates the user identification token, transaction amount, and any other associated information to the transaction system 106. The communication of the transaction information can be similar to such communications in a standard transaction system transaction, and can be performed over existing, established networks such as the network 104.

As a result, any gift card amount in a gift card record associated with the recipient user R's account in the transaction system 106 may then be applied automatically by the transaction system 106 to the transaction amount. The transaction system 106 recognizes the association of available gift card tokens prior to retrieving a user's financial instrument token and submitting the token and transaction to a payment processing server 110. The transaction system 106 stores the transaction information and decreases the remaining balance of the gift card record accordingly.

In some embodiments, if the balance on the gift card record exceeds the amount of the transaction, the transaction system 106 returns a message to the merchant system 108 approving the transaction, and does not submit the transaction to a payment processing server 110. In such embodiments, the transaction system 106 can facilitate payment of the transaction amount by the transaction system 106 to a financial account associated with the merchant system 108. In some embodiments, if the amount of the gift card was paid to the merchant at the time of the gift card purchase, the transaction system 106 may deliver to the merchant system 108 an accounting for the transaction.

In some embodiments, if the remaining gift card balance associated to the recipient user R's account is less than the transaction amount, the transaction system 106 may submit a charge to the user R's associated financial account, by submitting a user R's financial instrument token to a payment processor server 110 in the manner disclosed above. The submitted charge is for the transaction balance in excess of the remaining gift card amount. In this way, a small gift card balance can be applied to a larger purchase amount, and the transaction can be completed without requiring a separate payment step by the user. In some embodiments, the transaction system 106 provides digital receipts or messages to the recipient user R concerning the transaction, for example by communication to an application on the user R's computing or mobile device 102 integrated to the transaction system 106 and/or using addressable information associated with the user R's account, such as an email address. The message to the recipient user R may identify the balance remaining on the digital gift card associated with the user R's transaction system account. The remaining balance of the gift card may also be displayed in an application on the mobile device 102 in communication with the transaction system 106 at any time.

Redemption of Gift Cards by Non-User Recipients.

As discussed above, a non-user RR of the transaction system 106 may redeem a digital or physical gift card 103 at a merchant's POS terminal or online POS 108 by providing, presenting, or communicating the gift card token to the merchant in connection with a transaction (e.g., by displaying the gift card token in the form of a bar code or QR code, or by communicating the token by a proximity wireless communication technology). Upon presentation of the gift card identification token at a merchant POS terminal 108 by a consumer RR that is not a user of the transaction system 106, the merchant POS terminal 108 may communicate the gift card token information and transaction information to the transaction system 106 (e.g., via the network 104).

The transaction system 106 then can approve the transaction if the amount stored in the gift card record corresponding to the transmitted gift card token exceeds the transaction amount. The transaction system 106 stores the transaction information and decreases the gift card amount accordingly. Alternatively, the transaction system 106 can deny the transaction if the remaining amount in the gift card record is insufficient, and then inform the merchant and/or the merchant POS terminal 108 accordingly via a return message. In some embodiments, the transaction system 106 may facilitate payment to the merchant and/or accounting to the merchant system 108 as described above. The transaction system 106 may also provide digital receipts or messages to the gift recipient RR concerning the transaction. The recipient RR can be addressed using information provided by the purchasing user P upon gift card purchase and stored in the gift card record associated with the received gift card token.

Customization of Notifications.

A gift card notification from the transaction system 106 to a recipient R may be customized by the purchasing user P or gift card issuer, such as a merchant associated with the merchant system 108. Such a gift card notification can include, for example, messages, text, images, video, audio, multimedia, or a combination of such elements. The delivery notification may also be customized or themed automatically by the transaction system 106 according to parameters associated with an application or website used by the purchasing user P to purchase the gift card. For example, a gift card purchased by a purchasing user P via a mobile application maintained by Joe's Coffee Shop, in communication with the transaction system 106, may be delivered by the transaction system 106 in a notification that is automatically configured by the transaction system 106 to reflect the branding of Joe's Coffee Shop.

The purchasing user P or issuer of the gift card may also customize the nature of the delivery. For example, a gift card notification may be delivered immediately, at a time selected by the purchaser P, such as on the birthday of a receiving user R, or upon the completion of an event by the receiving user R, such as a purchase using the recipient R's account with the transaction system 106 at a designated merchant or of a designated item or category of items.

The delivery-triggering event may also be completed by a non-payment related event based on a receiving user R's use of an application integrated to the transaction system 106. Such an event can be, for example, the completion of a 5 kilometer run tracked by a fitness application on a mobile device 102 or the achievement of a gaming event using a game application, upon the communication of such information to the transaction system 106 by the application on the mobile device 102.

The delivery notification to a receiving user R may also be triggered by the user R's presence in a specified location or geographic area, using GPS data acquired by an application integrated to the transaction system 106 on the receiving user R's computing or mobile device 102. For example, the delivery notification can be triggered when a traveler R arrives at an airport in a vacation destination, or when a receiving user R arrives at a specified merchant location (which can also be determined by Bluetooth, NFC, or other proximity wireless communication from a mobile device 102 and indicated to a merchant system 108). Delivery of notifications of purchased gift cards may also be staged, such that the receiving user R is notified first that she may receive a gift card upon the completion of an event or arrival at a location, followed by a notification of the gift card, or allowing her to claim the gift card when she completes the event or arrives at the location.

Gift Card Recipient Interactions.

Upon receipt of a gift card notification as described herein, or following association by the transaction system 106 of a gift card token with a receiving user account (and a receiving user identification token) in the transaction system 106, a recipient R can then be prompted to interact with the transaction system 106 and/or the purchasing user P. Such interactions can be, for example sending a message to the purchasing user P to say "thanks," or some other messages created and customized by the receiving user R, or by purchasing a gift card for the purchasing user P or for another person.

In some embodiments, such prompting may occur immediately upon acknowledgment of the gift card by the receiving user R, or upon association of the gift card with the receiving user R's account, and/or may occur upon the receiving user R's use of the gift card at a merchant POS terminal or online POS 108. A message back to the purchasing user P may be customized by the receiving user R, or may be automated or automatically generated or selected from a list of automated messages by the transaction system 106 or the receiving user R. A message to a purchasing user P may also be automated and delivered without prompting the receiving user R.

A message to a purchasing user P may include transaction information, for example the merchant or merchant location at which the gift card was used, and/or the items purchased, based on a communication from the merchant system 108 of item information to the transaction system 106 in connection with a transaction request. In some embodiments, messages to a purchasing user P may be delivered by the transaction system 106 to an application on a mobile device 102 of the purchasing user P in communication with the transaction system 106 or to any addressable information associated with the purchasing user P's transaction system account or record, such as an email address.

In some embodiments, a gift card purchased by the receiving user R in response to such a prompt may be customized in the same way as described above. For example, the receiving user R may purchase a gift card for the purchasing user P to be delivered upon the purchasing user P attempting to conduct a transaction using the purchasing user P's account with the transaction system 106 at a designated merchant (e.g., including the merchant location at which the receiving user R used the received gift card).

Gift Card Restrictions and Limitations.

The flexibility of the transaction system 106 and the gift card structure disclosed herein permit the purchasing user P and/or a gift card issuer to create and impose any restrictions desired upon the redemption of the gift card. In some embodiments, the gift card record may be created in the transaction system 106 with geographic limitations. For example, the gift card may only be used within five miles of a specified location, or within a specified state or zip code. Geographic restrictions may be enforced by the transaction system 106 based on GPS data obtained by an application integrated to the transaction system 106 on a receiving user R's computing or mobile device 102, or by location information stored in or transmitted to the transaction system 106, for a merchant system 108 for an attempted transaction, or by other known means.

In some embodiments, the gift card may be created with temporal restrictions. For example, the gift card may not be used after midnight, or may be used only before 9 AM. In some embodiments, the gift card may be restricted to specific merchants or categories of merchants, such as "Joe's Coffee Shop" or all coffee merchants. Similarly, the gift card may be restricted to certain items or categories of items, such as decaf coffee or all types of coffee.

In some embodiments, the transaction system may be integrated with sources of information from third party applications in communication with the transaction system 106 including, for example, information about the current weather in various locations. In such embodiments, the gift card may be restricted by relying on such information. For example, the gift card can be used only when it is raining in the gift card recipient's location. Any of the above restrictions may be combined, and other restrictions may also be created.

In some embodiments, the transaction system 106 may enforce these restrictions at the time of a transaction request is received at the transaction system 106. In such embodiments, for example, the transaction system 106 can enforce the restrictions by first identifying any gift card records associated with a receiving user R's account in the transaction system 106, and then checking information contained in the transaction request from a merchant system 108 against restrictions associated to the gift card record to determine whether the received transaction request qualifies for the application of any gift card balance associated with the gift card record. The information contained in a transaction request can include, for example, item information, merchant identity, and/or the like.

Further examples of gift card restrictions and customizations are discussed herein, and are intended as examples only, and do not limit the scope of the present application. Moreover, any of the examples of limitations and customizations disclosed herein may be combined to create new and/or more complex redemption rules by the purchasing user or gift card issuer using the disclosed transaction system 106.

Gift Card Customization and Negotiation.

Upon receipt of a gift card notification as described herein, the transaction system 106 may permit a recipient or receiving user R to indicate to the purchasing user P a preference for a different type of gift card, e.g., via a return message to the purchasing user P. For example, a recipient R of a gift card that is limited to use at Joe's Coffee Shop may respond to the purchasing user P that the recipient R does not drink coffee, but does enjoy tea from Steve's Tea Shop. The transaction system 106 then permits the purchasing user P to elect to modify the limitations associated with the purchased gift card in the transaction system 106 to change the gift card from a Joe's Coffee Shop card to a Steve's Tea Shop Card.

In some embodiments, the transaction system 106 also enables a purchasing user P to make intelligent decisions about gift card purchases using data stored in the transaction system 106 concerning a receiving user R's preferences. For example, a purchasing user P may be shown a list of merchant locations, or items, that a receiving user R most frequently visits or purchases using her transaction system account. Thus, the purchasing user P may select a location or item from the list presented by the transaction system 106 in order to limit the nature of purchases that may be made using the gift card.

Alternatively, for another example, the purchasing user P may allow the receiving user R to select a location for the redemption of the gift card from a list of three locations proposed by the purchasing user P. In that case, the notification to the receiving user R would identify the three choices (e.g., either by name or by obscuring the name) and prompt the receiving user R to select one and communicate the selection to the transaction system 106. Upon the selection, the gift card token associated with the receiving user R's account would be updated to reflect the selected limitation on use. Because of the flexibility of the transaction system 106, such selection mechanisms can be customized to include any limitations on, for example, location, merchant, items, categories of merchants or items, geography or time, and/or the like that is desired by the purchasing user.

In some embodiments, the transaction system 106 can notify the purchasing user P of the recipient or receiving user R's selection. The transaction system 106 may further communicate to merchants associated with merchant systems 108 in communication with the transaction system 106 that a request has been made by a potential purchasing user for a list of gift card options for a recipient that includes said merchants. The merchant systems 108 may then communicate to the transaction system 106 an intent to offer further incentives to the purchasing user to entice the purchase of a particular merchant's gift card. Such incentives can include, for example, granting the receiving user R a $100 gift card for a cost of $90 to the purchasing user P, granting the purchasing user P a $10 gift card in exchange for purchasing a $100 gift card for the receiving user R, and/or the like. Accordingly, these amounts can be associated automatically by the transaction system 106 with the purchasing and/or receiving user accounts, as appropriate.

Post-Purchase Modifications.

As described elsewhere herein, the transaction system 106 may allow a purchasing user P to receive information concerning the purchases made using the gift card by the receiving user R at the time of a transaction. The transaction system 106 may also permit the purchasing user P to view all transactions made using the gift card at any time (e.g., using a software or web application). Such information may be used by the purchasing user P to impose additional restrictions on the gift card or to remove limitations, by modifying the gift card record in the transaction system 106.

For example, a purchasing user P (who may be a parent of a receiving user), may specify that the gift card may no longer be used at certain restaurants, locations, categories of merchants or for items that the purchasing user P intends to discourage. The purchasing user P may also specify geographic, temporal, or other limitations subsequent to the initial purchase and use of the gift card. The transaction system 106 may further allow the purchasing user P to retract the gift card in whole or in part.

Open-Ended Gift Cards.

In some embodiments, the transaction system 106 disclosed herein may further permit a purchasing user P to purchase a gift card not for a predefined, fixed amount, but good for an open-ended amount in any single transaction, a specified number of transactions, and/or over a specified time period by a receiving user R. For example, a purchasing user P may desire to purchase dinner for a recipient R, but not wish to limit the recipient R to any predefined, fixed amount that the recipient R will use in a single transaction.

In such embodiments, upon receipt and use of the gift card by the recipient or receiving user R, the gift card record in the transaction system 106 (which is associated with both the recipient R and the purchaser P's transaction system accounts and identification tokens) can be updated to reflect the amount of the purchases actually made by the recipient R. Upon redemption of the gift card, or at a time specified by the purchasing user P, the transaction system 106 may charge the financial account associated with the purchasing user P (e.g., associated with the purchasing user P's transaction system account and identification token) for the amount of the gift card purchases made by the receiving user R, according to the methods disclosed herein (e.g., by submitting a financial account token to a payment server 110).

Purchasing User Rewards.

The transaction system 106 disclosed herein may also reward a purchasing user P for transactions made using the transaction system 106 by, for example, offering the purchasing user P the opportunity to purchase gift cards at discounted rates, or other products not available to the general public, once the purchasing user P has achieved a certain status level. Such a certain status level can be specific to the merchant issuing the purchased gift card. A merchant may also use the disclosed transaction system 106 to offer rewards to users to incentivize purchase of gift cards useable at that merchant's locations. Such rewards include, for example, granting the purchasing user P a merchant-funded gift card upon the purchase of a gift card, providing the purchasing user P free goods or services in exchange for purchasing a gift card, and/or the like. In that case, the transaction system 106 in communication with a merchant system 108 would inform the merchant of the gift card purchase and the reward to be provided, and/or can create a second gift card record in the transaction system 106 to be associated with the purchasing user's account.

Gift Card Surprises.

A gift card purchased by a purchasing user P may also be created in such a way so as to specify in the gift card record in the transaction system 106 certain items, products, goods, or services to be delivered to the gift card recipient R upon presentation of the gift card. For example, a gift card delivered to a recipient R may only inform the recipient that she should present the gift card (or the receiving user R's transaction system identification token that is associated with the digital gift card record) at a selected restaurant's POS terminal 108 before ordering. The restaurant's POS terminal 108 can communicate the identification or gift card token to the transaction system 106, which can respond to the merchant's POS terminal 108 with information from the gift card record in the transaction system 106 informing the restaurant of the goods and services to be delivered to the customer R (e.g., a three-course meal selected by the purchasing user P), which are from a menu of items provided to the transaction system 106 by the merchant.

Progressive Gift Cards.

The flexibility of the transaction system 106 disclosed herein further permits a purchasing user P to designate that a gift card may be used at several selected locations, but only in a specified order of progression. For example, the gift card may be purchased for a "night on the town," which requires a receiving user R to first redeem the gift card at a specified bar (or at any bar), then to next redeem the gift card at a specified restaurant (or at any restaurant), and finally to redeem the gift card at a specified movie theater (or at any movie theater). These limitations may be reflected in the gift card record created in the transaction system 106 at the time of purchase and enforced by the transaction system 106 at the time the gift card identification token or receiving user identification token is communicated to the transaction system 106 by the merchant POS or online POS 108. Such progressive gift cards can further be coupled with multiple messages such as, for example, a initial message upon delivery of the gift card from the transaction system 106 instructing the receiving user R where to use the gift card first, followed by subsequent messages to be delivered to the receiving user R upon each qualifying transaction to instruct the user R where the gift card may be used next.

Group Gift Cards.

The flexibility of the transaction system 106 disclosed herein further permits a purchasing user P to designate more than one recipient or receiving user R (e.g., a family of recipients) for a single digital gift card. In that case the transaction system 106 creates a gift card record that includes and is associated in the transaction system 106 with multiple authorized receiving users R. Each time the purchased gift card is redeemed by one of the receiving users R in the manner disclosed herein (e.g., associated with the receiving user R's transaction system account and user identification token or used as a stand-alone gift card token), the transaction system 106 stores the transaction information, applies the gift card balance to the transaction amount, and decreases the remaining amount in the gift card record. This functionality can also be useful for corporate group dining, for example.

Game-Based Gift Cards.

The flexibility of the transaction system 106 disclosed herein further permits the granting of gift cards as a promotional event that may be used by a promoter as a game for designated recipients. For example, a promoter may provide a gift card token to 100,000 designated recipients (or to unlimited recipients) that choose to retrieve the gift card identification token and/or associate the gift card identification token with their transaction system user accounts. The gift card token is limited to use at a specified merchant or merchant location on a specified day, but such limits are not disclosed initially to the gift card recipients. On the day that the gift card is usable, the promoter may publish a clue (e.g., on a website, by email, by social media posting, or in an application integrated to the transaction system 106) to the location where the gift card may be used. Redemption of the gift card may be, for example, limited to a certain amount of value per redemption, limited to an aggregate amount of value, unlimited, or limited to a certain number of users (such as the first ten users) to present the gift card identification token at the location reflected by the clue. The gift card record may be modified by the promoter on a daily basis such that the same gift card token becomes usable at a different location each day. A promoter may alternatively award a gift card using the transaction system 106 disclosed herein to the first user R (or to all users) to complete a challenge using a website or an application integrated to the transaction system 106 (e.g., a trivia game, puzzle game, word game, or other task).

Pay-it-Forward Cards.

The flexibility of the transaction system 106 disclosed herein further allows a transaction system user P to purchase gift cards for unidentified recipient users R. For example, an application integrated to the transaction system 106 and used to display or communicate a user's transaction system identification token to a merchant's POS terminal 108 may prompt the user, upon a purchase from the merchant, to purchase a gift card good for one coffee for the next user to engage in a transaction at that merchant location, or to purchase a gift card good for one coffee for a user R to be identified by the merchant at the time of a later transaction (i.e., a house account). This would permit, for example, the merchant to give a coffee to a customer who cannot afford to purchase the coffee from the house account funded by a purchasing user P. In this case, the gift card record for the house account gift card is a record associated with the merchant's identification token in the transaction system 106, and the user P may add value to that gift card record.

Alternatively, the transaction system 106 may permit a transaction system user P to purchase a gift card good for a specified amount or for a specified item, for a user to be selected at random or according to an algorithm as determined by the transaction system 106, and/or according to certain restrictions requested by the purchasing user P (e.g., a user in a specified geographic location). As disclosed herein, the messaging to the receiving user R may inform the receiving user R of the identity of the purchasing user P, and/or can allow the receiving user R to message the purchasing user P (e.g., anonymously) to say "thank you."

Social Media and Dating Site Gift Cards.

The flexibility of the transaction system 106 disclosed herein further permits a transaction system user P to purchase a gift card for a recipient R identified by a profile on a social media or dating website that is integrated to and in communication with the transaction system 106. For example, a purchasing user P may identify an individual's profile on a social media or dating website or application to receive a free coffee. The receiving user R can be notified as disclosed herein, or within said web application. The receiving user R can claim the digital gift card by associating the gift card with her transaction system user account. The receiving user R can then send a message to the purchasing user P to say "thanks." Alternatively, a purchasing user P's account in the transaction system 106 may include additional information identifying the purchasing user P by, for example, gender, sexual orientation, relationship status, or other attributes. The transaction system 106 can allow the purchasing user P to give gift cards to and/or receive gift cards from other users selected by the transaction system

106 blindly matching the user's identified preferences, and/or selected by the transaction system 106 based upon similarities in the user's transaction histories.

Notifications to Merchants, Suppliers, or Manufacturers.

Upon the purchase or delivery of a gift card, the transaction system 106 may be configured to notify third parties (e.g., merchants, suppliers, or manufacturers) that a transaction system user R has just received a gift card that qualifies for use at their locations or for the purchase of their goods or services. Such third parties may desire to incentivize or entice the gift card recipient R to redeem the gift card value at their location or for their goods, rather than at a competing location or for competing goods that also qualify for the gift card. Such third parties may register with the transaction system 106 to receive such notifications, and may provide to the transaction system 106 financial account information to enable the transfer of funds to and/or from the transaction system 106 (e.g., by automated clearing house (ACH) transfer).

Through the transaction system 106, such third parties may offer additional rewards or credit to the gift card recipient R in exchange for redeeming the gift card value at their location or for their goods or services. The transaction system 106 disclosed herein facilitates such marketing offers by creating records of marketing offers and/or credit provided by third parties and associating such records with the gift card record in the transaction system 106, or with the receiving user R's account in the transaction system 106. Those offers or credit records are redeemed and applied automatically when the gift card token or receiving user R's identification token is presented at a merchant POS terminal or online POS 108 as a payment for a purchase transaction. The communications between the reward offeror, redeeming merchant, and the transaction system user R within the transaction system 106 permit the transaction system 106 to facilitate the transfer of money or value between the third-party offeror and the redeeming merchant.

Secure Physical Gift Cards.

The present approach also addresses certain other problems and needs discussed above by providing a physical gift card 103 usable with the transaction system 106 that is secure from theft or fraud. For example, in some embodiments, a physical gift card 103 associated with the transaction system 106 described above may be purchased by a purchaser P without the need to establish an account with the transaction system 106. For example, the physical gift card 103 can be purchased at a merchant's POS terminal 108 in a conventional retail purchase transaction (such as by using cash, or a credit or debit card) or at an online POS to be delivered by mail or printed from a standard computer.

Physical gift cards 103 may include gift card identification token information, which identifies a gift card account record to the transaction system 106. Such token information may be imprinted on the card 103 (or on paper) in the form of, for example, a barcode or QR code. Such token information can also be encoded as an RFID tag, or by other known means allowing for the token information to be communicated or conveyed to a merchant POS terminal 108 from a physical gift card 103.

The transaction system gift card record corresponding to the imprinted gift card token may further include a second token (referred to herein as an activation token), which may only be used when the gift card token is activated upon purchase. In order to protect the secure or sensitive information of the gift card token imprinted upon on the physical gift card 103 prior to purchase (e.g., from thieves that may seek to capture an image of the magnetic strip, QR code or bar code encoding the gift card token so that the thieves can use the information later (after gift card activation) in order to make fraudulent purchases), the physical gift card 103 and imprinted code are placed in a scaled envelope designed to be opened only by the recipient R. The envelope may be customized by the merchant and include areas for customization by the purchaser P. The envelope also is imprinted with a QR code or bar code or the like encoding the activation token specific to the sealed gift card token.

Upon purchase, the retail merchant can scan the activation token from the sealed envelope at the POS terminal 108 and communicate the activation token and amount to be activated on the gift card to the transaction system 106 (e.g., via the network 104). The transaction system 106 can then associate that amount of value with the gift card record associated with the activation token, which is also associated with the scaled gift card token. The transaction system 106 can cancel the activation token, rendering the token meaningless. Because the gift card token remains in a sealed envelope during activation, there is no or little risk of later fraudulent use of a compromised gift card token after activation.

Redemption of Loyalty and Rewards Credit Using Physical Gift Cards.

In some embodiments, the transaction system 106 may collect information about purchases made using a physical gift card 103 at a merchant POS terminals 108 (including for example items purchased by the gift card recipient R, the time and locations of purchases, etc.), and store the information in a manner associated with the gift card record in the transaction system 106. The transaction system 106 may also store information concerning any applicable rewards offered by merchants to incentivize consumer purchases (e.g., new-customer rewards, special promotion rewards, customer loyalty points, progress in customer loyalty campaigns, etc.), which are earned by the gift card recipient when using the plastic gift card 103, and then store such information concerning earned rewards in a manner associated with the gift card record in the transaction system 106.

When the gift card 103 is used, the transaction system 106 may automatically apply any such rewards or offers from merchants earned by the physical gift card holder R to the transaction amount. When a transaction system user R chooses to associate the gift card record in the transaction system 106 with a user's account in the transaction system 106, the information collected by the transaction system 106 concerning the gift card usage and/or earned rewards can be combined with similar information collected by the transaction system 106 concerning the usage of the user's transaction system identification token to initiate purchase transactions. The combination of such information provides a valuable means to understand consumer purchasing trends and can be used to direct more effective marketing and promotions to consumers.

Transferring Gift Card Value Between User Accounts.

In some embodiments, the transaction system 106 disclosed herein enables a consumer user U to maintain multiple user accounts within the transaction system 106, and to transfer an associated gift card value or other credit between the accounts. For example, the consumer user U of the transaction system 106 may maintain a first account in the transaction system 106 for personal use (which is associated with a personal payment instrument or financial account such as a personal debit or credit card or bank account), and a second account within the transaction system 106 for corporate or business use (which is associated with a corporate payment instrument or financial account such as a corporate credit card or corporate bank account). Such accounts may be associated with the same email address, or different email addresses for the same user U.

In some embodiments, the user U may receive or earn gift card credit, merchant reward or loyalty credit that becomes associated with the user U's corporate account within the transaction system 106, which the user U does not wish to be applied to future purchase transactions using the user U's corporate account. The user U may instead want such gift card value or credit to be redeemed in connection with or toward future transactions made using the user U's personal account. By creating the system of gift card credit disclosed herein, the user U may choose to associate the user U's corporate and personal accounts in the transaction system 106 such that any or all gift card value or credit received and associated with one of the user U's accounts (e.g., the user U's corporate account) is immediately associated by the transaction system 106 to the user U's another account (e.g., the user U's personal account), and no longer associated with the user U's previous account (e.g., the corporate account).

In this way, the gift card value or credit will be available toward future purchase transactions made using the user U's personal account token in the transaction system 106. A further advantage of the transaction system 106 is that any gift card received by a receiving user R may be transferred to any other transaction system user U at the direction of the receiving user R simply by identifying a new recipient U to the transaction system 106, which updates the record associated with the gift card accordingly. The transaction system 106 may permit an exchange or forum for receiving users R to offer their gift cards for trade to other receiving users U. Once transferred to another user U, a gift card record may no longer be usable by the original recipient R. In this way, gift cards may be effectively, efficiently, securely, and irrevocably transferred between receiving user accounts.

Designation by Recipient of Transaction System Account to Receive Gift Cards.

Alternatively, a transaction system user U may establish an account with a merchant by providing to the merchant identifying information (such as a username, alias, or email address) associated with both the user's personal account in the transaction system 106 and the user's corporate account within the transaction system 106. The user U's account with the merchant may establish a user preference such that purchase transactions at the merchant should be made using the user's corporate account token in the transaction system 106, but that any rewards credit, loyalty credit, or gift card value earned by the user and/or granted by the merchant for such purchases to the user U should be directed to the user U's personal account in the transaction system 106. In this way, a merchant, such as a corporate catering provider, may incentivize an individual U to make purchases from the merchant using the user U's corporate account token in the transaction system 106 by directing rewards or loyalty credit or gift card value to the user U's personal account in the transaction system 106, to be used for future purchase transactions in the user U's personal capacity.

Redemption of Gift Cards for Cash.

The transaction system 106 disclosed herein further provides gift card recipients R greater flexibility to redeem remaining gift card balances for cash or other value, for example as required by some state laws in the United States. For example, the transaction system 106 can provide the receiving user R an option to transfer a remaining gift card balance that is restricted to use at a single merchant location into a global credit in the transaction system 106, which is usable at any location or for any purpose. Alternatively, the transaction system 106 can offer a receiving user R the option to have a remaining gift card balance refunded directly to a financial account associated with the user R's transaction system identification token, such as via an ACH transfer or credit or debit refund. Alternatively, the transaction system 106 can communicate to a merchant POS terminal 108 to provide a receiving user R the option to select cash back at the merchant POS 108. In that case, the transaction system 106 may facilitate the transmission of value from the transaction system 106 to the merchant to compensate the merchant for the cash back provided to user R, or may simply deliver a proper accounting of the transaction to the merchant.

Flexibility of Transaction Balance Custodian.

The transaction system 106 disclosed herein provides to merchants and gift card issuers the flexibility to elect to receive money or value associated with a gift card purchase immediately upon the purchase of the gift card by a purchasing user P via the transaction system 106, or to receive the money from the transaction system 106 only upon the redemption of the gift card by the receiving user R. For example, when a purchasing user P purchases a gift card for $10 usable only at Joe's Coffee Shop, the transaction system 106 charges the purchasing user P (e.g., via the financial account token associated with the purchasing user P's transaction system identification account as described above, including by submitting the token to a payment server 110), and the transaction system 106 receives the $10 upon settlement by the purchasing user P's issuing bank. The merchant, Joe's Coffee Shop, has the option to receive the $10 immediately from the transaction system 106. In that case, each time the purchased gift card is used, the transaction system 106 notifies the merchant, Joe's Coffee Shop, of the transaction (and possibly other information such as the remaining gift card balance), but does not transfer any money or value to the merchant for the amount of that transaction. Alternatively, the merchant, Joe's Coffee Shop, may elect to have the transaction system 106 retain the $10 on the merchant's behalf and to transfer the money to the merchant each time the gift card is used for a transaction, in the amount of the individual transaction.

Migration of Gift Card Programs to the Transaction System.

In some embodiments, the transaction system 106 provides advantages to merchants that desire to migrate an existing gift card system or scheme to a gift card system managed using the transaction system 106. Upon a migration, the merchant can provide to the transaction system 106 an accounting of all outstanding gift card identifiers and amount information. The transaction system 106 may create a gift card record in the transaction system 106 (and an associated gift card token) for each outstanding gift card. The transaction system 106 in communication with the merchant's POS terminal 108 can then continue to accept any outstanding merchant gift card, including a magnetic stripe card, by communicating such information to the transaction system 106 at the time of a gift card transaction, without any interruption in service to the user R.

Specifically, upon the presentation of an existing gift card, such as by a magnetic swipe of the gift card, the merchant POS terminal 108 can communicate that swipe information to the transaction system 106, rather than to an internal server or to a prior gift card provider system or processing server 110. The transaction system 106 can then provide a merchant, via the terminal 108, with a one-time use token associated with the gift card token created in the transaction system 106 that corresponds to the magnetic stripe card in the possession of the receiving user R. The merchant can use the one-time use token to submit the gift card transaction to the transaction system 106 from the terminal 108 as described herein.

Furthermore, a gift card holder R may be prompted by the merchant to establish an account with the transaction system 106, and to associate the existing gift card with its new transaction system identification token by entering the existing gift card identifier (e.g., an alphanumeric code) into a software, mobile, or web application in communication with the transaction system 106. In that way, an existing gift card can be associated with a user transaction system account in the same manner as a physical gift card 103 purchased using the transaction system 106 (as explained above).

Data Reporting and Analytics.

The transaction system 106 disclosed herein provides a further benefit in that the transaction information recorded by the transaction system 106 in connection with each gift card transaction may be analyzed (individually or in the aggregate) to identify trends in consumer behavior (e.g., the frequency of gift card usage, the most popular items, merchants, or locations among gift card users, the average amount spent by gift card recipients, etc.). Such information may be combined with other information within the transaction system 106 concerning user purchasing behaviors, and communicated to purchasing or receiving users, or to merchants, suppliers, or manufacturers in communication with the transaction system 106, for a variety of purposes apparent to those of skill in the art.

Reloading Gift Cards.

In some embodiments, gift card records in the transaction system 106 may be reloaded by receiving users or purchasing users, in the same manner that gift card value was added initially. The methods include, for example, by purchases through web or mobile applications in communication with the transaction system 106, using financial payment information associated with a reloading user's transaction system account, at a merchant's physical POS system 108 using cash or any other available payment method, and/or the like. In order to reload a gift card record at a merchant system 108, a gift card token or a user token associated with the gift card token is provided to the merchant system 108 (e.g., scanned by a scanner 112 associated with a mobile device 102), and communicated to the transaction system 106 along with the amount to be loaded to the gift card record, to be charged by the merchant at the POS 108. The transaction system 106 is capable of transferring value from the merchant to the transaction system 106 via, for example, an ACH transfer or other known means based on information associated with the merchant's account in the transaction system 106.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A computer-implemented method for transferring funds, comprising:

using a transaction system comprising a processor:

receiving, from a first user equipment, a request to create a stored value and to transfer the stored value to a merchant point-of-sale (POS) device;

identifying, from an electronic user database and using a first user token associated with the first user equipment, a first electronically stored entry associated with the first user equipment, wherein the first electronically stored entry comprises electronically stored information relating to a payment account of the first user equipment;

electronically transmitting via a network, a request to a payment server to transfer an amount of funds from the payment account of the first user equipment to a stored-value account, the amount of the transferred funds corresponding to an amount of the stored value;

computationally generating a unique stored-value token and a stored-value token record for the stored-value account;

associating the stored-value token record and the stored-value token with the amount of the transferred funds;

associating the stored-value token with a second electronically stored entry in the user database, wherein the second electronically stored entry comprises a second user token identifying the merchant point-of-sale (POS) device;

receiving, from a merchant point-of-sale (POS) terminal, a request for payment initiated by the merchant POS device, wherein the request for payment comprises the second user token, by using a code reader/scanner coupled to the merchant POS terminal to scan a first QR code comprising the second user token from a display of a mobile device of the merchant POS device, rather than the stored-value token;

identifying, from the user database and using the second user token, the second entry;

automatically applying any gift card amount, in the second entry to a transaction amount, by the transaction system recognizing an association of available gift card tokens prior to receiving a financial instrument token of the merchant POS device and submitting the transaction to a payment processing server, and including updating the amount, of funds associated with the stored-value token based on an amount of funds associated with the request, for payment; and transmitting, from the stored-value account and based on the updating, at least a portion of the stored value to the merchant;

using a camera of the mobile device of the merchant POS device, and an application on the mobile device that integrates with the transaction system, scanning a second QR code comprising a user identification token of the merchant POS device;

using the camera and the application, scanning a third QR code from a plastic card comprising a physical gift card, the third QR code comprising a digital gift card identification token;

using the mobile device of the merchant POS device, communicating the user identification token of the merchant POS device and the digital gift card identification token to the transaction system;

the transaction system associating the scanned gift card token with the second entry and canceling a validity value associated with the digital gift card identification token.

2. The computer-implemented method of claim 1, wherein the stored value is contained on a second gift card.

3. The computer-implemented method of claim 1, further comprising: receiving, from the first user equipment, restrictions or limitations on the redemption of the funds, wherein the restrictions include geographic limitations, temporal restrictions, item restrictions, merchant restrictions, or a specified order of merchants or items; and electronically associating such restrictions with the stored-value token record.

4. The computer-implemented method of claim 3, further comprising computationally comparing stored information in the request for payment to stored restrictions associated with the stored-value token record and computationally determining whether the request for payment satisfies those restrictions.

5. The computer-implemented method of claim 1, wherein if the amount of funds associated with the request for payment is greater than the amount of the transferred funds associated with the stored-value token record, charging an excess payment amount to a payment account associated with the merchant POS device.

6. The computer-implemented method of claim 1, further comprising electronically transmitting a notification of the transfer of stored value to the merchant POS device, wherein the notification is customized by the first user equipment.

7. The computer-implemented method of claim 6, wherein the notification is delivered to the merchant POS device following the receipt of information communicated by the application operated by the merchant POS device.

8. The computer-implemented method of claim 1, wherein the generated stored-value token record comprises an upper limit as a restriction on the redemption of the transferred funds such that the amount of stored value transmitted to the merchant cannot exceed the upper limit in a single transaction, in a specified number of transactions, or over a specified time period by the merchant POS device.

9. The computer-implemented method of claim 1, further comprising, after receiving the request, for payment initiated by the merchant POS device, charging the amount of funds associated with the request for payment to the payment account associated with the first, user equipment.

10. The computer-implemented method of claim 1, further comprising (i) electronically communicating to third parties information indicating that the merchant POS device has received the stored value; and (ii) electronically communicating to the mobile device of the second user advertisements or incentives to redeem the stored value for products or services associated with said third parties.

11. The computer-implemented method of claim 1, wherein the request from the first, user equipment to transfer the stored value to the merchant POS device further requests that the stored value be also redeemable by a third user.

12. The computer-implemented method of claim 1, wherein the request from the first, user equipment comprises information regarding an account of the merchant POS device on a social-media or dating website.

13. A computer system for transferring funds, comprising:
nonvolatile computer storage including a user database, the user database comprising a first, entry associated with a first user equipment, and a second entry associated with a merchant POS device:

one or more computer processors configured for:
i. receiving, from the first, user equipment a request to create a stored value and to transfer the stored value to the merchant POS device;
ii. computationally identifying, from the user database and using a first user token associated with the first user equipment, the first, entry that comprises information relating to a payment account of the first user equipment;
iii. sending a request to a payment server to transfer an amount of funds from the payment account of the first user equipment to a stored-value account, the amount of the transferred funds corresponding to an amount of the stored value;
iv. computationally generating a unique stored-value token and a stored-value token record for the stored-value account;
v. associating the stored-value token record and the stored-value token with the amount of the transferred funds;

vi. associating the stored-value token with a second entry' stored in the user database, wherein the second entry comprises a second user token identifying the merchant POS device;

vii. receiving, from a merchant point-of-sale (POS) terminal, a request for payment initiated by the merchant POS device, wherein the request for payment comprises the second user token, by using a code reader/scanner coupled to the merchant POS terminal to scan a first QR code comprising the second user token from a display of a mobile device of the merchant POS device, rather than the stored-value token;

viii. identifying, from the user database and using the second user token, the second entry;

ix. automatically applying any gift card amount in the second entry to a transaction amount, by the transaction system recognizing an association of available gift card tokens prior to receiving a financial instrument token of the merchant POS device and submitting the transaction to a payment processing server, and including updating the amount of funds associated with the stored-value token based on an amount of funds associated with the request for payment;

x. transmitting, from the stored-value account and based on the updating, at least a portion of the stored value to the merchant;

xi. using a camera of the mobile device of the merchant POS device, and an application on the mobile device that integrates with the transaction system, scanning second QR code comprising a user identification token of the merchant POS device;

xii. using the camera and the application, scanning a third QR code from a plastic card comprising a physical gift card, the third QR code comprising a digital gift card identification token;

xiii. using the mobile device of the merchant POS device communicating the user identification token of the merchant POS device and the digital gift card identification token to the transaction system;

xiv. the transaction system associating the scanned gift card token with the second entry and canceling a validity value associated with the digital gift card identification token.

14. The computer system of claim 13, wherein the stored value is contained on a second gift card.

15. The computer system of claim 13, wherein the transfer request is received from a cellular phone, mobile device, tablet PC, laptop PC, or desktop PC.

16. The computer system of claim 13, wherein the payment request is received from a cellular phone, mobile device of the merchant POS device, tablet PC, laptop PC, or desktop PC.

17. A telecommunication-based system for transferring funds, the system comprising:
a mobile device comprising one or more processors and a network interface;
a point-of-sale (POS) terminal operated by a merchant, the POS terminal comprising one or more processors, a code reader/scanner and a network interface;
a payment server comprising one or more processors and a network interface; and
a management server comprising one or more processors, a network interface, and nonvolatile storage comprising a user database, the user database including entries comprising a first entry associated with a first user equipment and a second entry associated with a merchant POS device, the first entry comprising a first user token identifying the first user equipment and information relating to a payment account of the first user equipment and the second entry comprising a second user token identifying the merchant POS device, wherein:
the management server is configured to (i) receive, from the first user equipment via the network interface of the management server, an electronic request to create a stored value and to transfer the stored value to the merchant POS device, and (ii) identify the first entry in the user database using the first user token;
the management server and the payment server are in electronic communication via their respective network interfaces, the management server being configured to (i) electronically transmit, to the payment server, a request to cause transfer of funds from the payment account of the first user equipment to a stored-value account, the funds having an amount corresponding to an amount of the stored value, (ii) computationally generate a unique stored-value token and a stored-value token record for the stored-value account, and (iii) modify the user database by associating the stored-value token record and the stored-value token with the amount of the transferred funds, and associating the stored-value token with the second entry; and
the POS terminal, the mobile device and the management server are in electronic communication via their respective network interfaces, wherein:
the POS terminal is configured to (i) retrieve the second user token from the mobile device, and (ii) send, to the management server, a request for payment initiated by the merchant POS device and including the second user token, by using a code reader/scanner coupled to the merchant POS terminal to scan a first QR code comprising the second user token from a display of a second mobile device of the merchant POS device, rather than the stored-value token; and
the management server is configured to (i) identify the second entry in the user database using the second user token, (ii) automatically apply any gift card amount in the second entry to a transaction amount, including to recognize an association of available gift card tokens prior to receiving a financial instrument token of the merchant POS device and submitting the transaction to a payment processing server, and including to update the amount of funds associated with the stored-value token based on an amount of funds associated with the request for payment, and (iii) transmit, from the stored-value account and based on the update of the amount of funds, at least a portion of the stored value to the merchant;
using a camera of the second mobile device of the merchant POS device and an application on the second mobile device that integrates with the management server, scanning a second QR code comprising a user identification token of the merchant POS device;
using the camera and the application, scanning a third QR code from a plastic card comprising a physical gift card, the third QR code comprising a digital gift card identification token;
using the second mobile device of the merchant POS device, communicating the user identification token of the merchant POS device and the digital gift card identification token to the management server;

the management server associating the scanned gift card token with the second entry and canceling a validity value associated with the digital gift card identification token.

18. The telecommunication-based system of claim 17, further comprising a gift card comprising a nonvolatile medium readable by the POS terminal, the nonvolatile medium storing the stored value.

* * * * *